United States Patent [19]

Fletcher et al.

[11] B 3,983,749

[45] Oct. 5, 1976

[54] ANNULAR ARC ACCELERATOR SHOCK TUBE

[76] Inventors: James C. Fletcher, Administrator of the National Aeronautics and Space Administration, with respect to an invention of Lewis P. Leibowitz, Arcadia, Calif.

[22] Filed: Nov. 6, 1974

[21] Appl. No.: 521,620

[44] Published under the second Trial Voluntary Protest Program on January 27, 1976 as document No. B 521,620.

[52] U.S. Cl. .................................................. 73/147

[51] Int. Cl.² .......................................... G01M 9/00

[58] Field of Search ................................ 73/147, 35

[56] References Cited

OTHER PUBLICATIONS

"Development of an Annular Arc Accelerator Shock Tube Driver", Leibowitz, July 1973, pp. 679–689, of Proceedings of the Ninth International Shock Tube Symposium, Stanford University.

*Primary Examiner*—Donald O. Woodiel
*Attorney, Agent, or Firm*—Monte F. Mott; Wilfred Grifka; John R. Manning

[57] ABSTRACT

An annular arc accelerator shock tube employs a cold gas driver to flow a stream of gas from an expansion section through a high voltage electrode section to a test section, thus driving a shock wave in front of it. A glow discharge detects the shock wave and actuates a trigger generator which in turn fires spark-gap switches to discharge a bank of capacitors across a centered cathode and an annular anode in tandem electrode sections as the initial shock wave passes through the anode section from the cathode section thereby depositing energy into the flow gas without the necessity of any diaphragm opening in the gas flow from the expansion section through the electrode sections.

9 Claims, 4 Drawing Figures

FIG. 3.
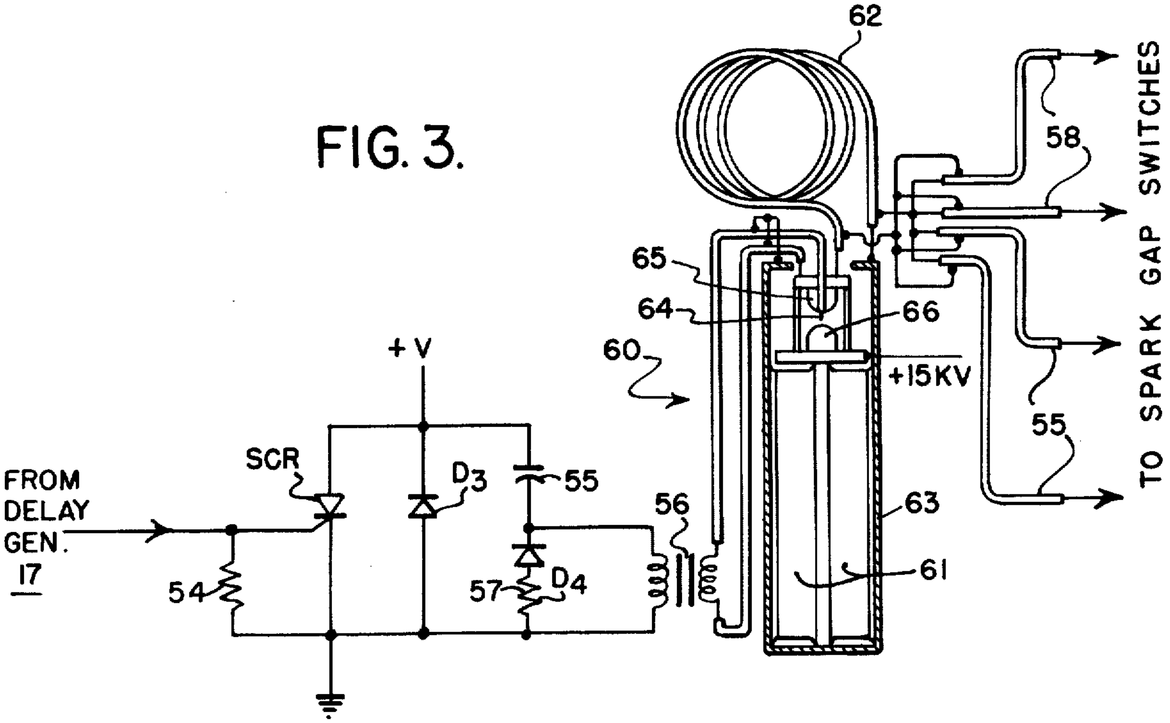
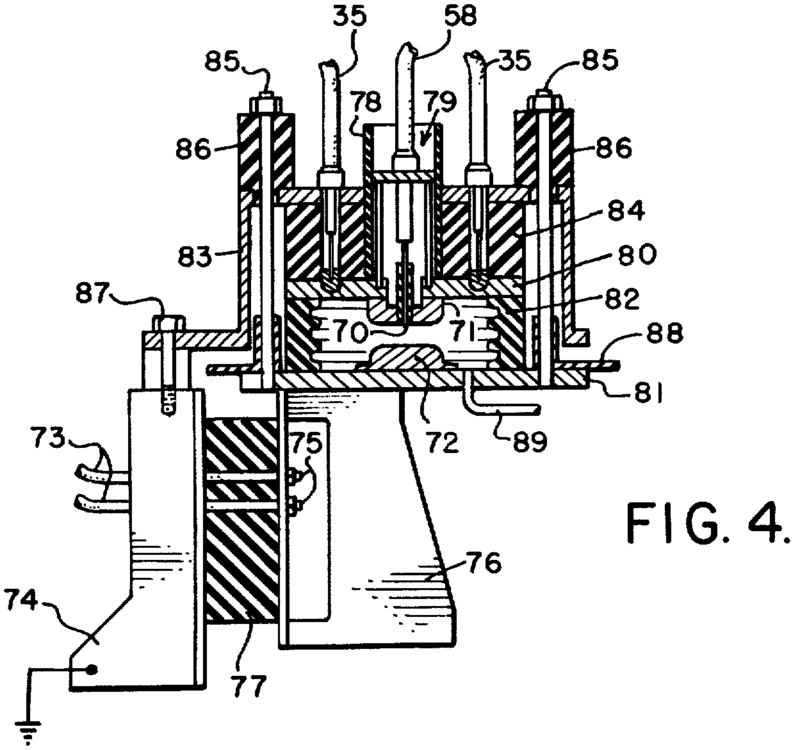
FIG. 4.

ANNULAR ARC ACCELERATOR SHOCK TUBE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to shock tubes, and more particularly to an annular arc accelerator shock tube.

There is a continuing need for a shock tube that will simulate entry of a spacecraft or probe into the atmosphere of a planet, such as Jupiter, in order to study the effects of entry shock. Past efforts to develop shock tubes have fallen short of desired goals. An electric arc driven shock tube described by W. A. Menard, "A Higher Performance Electric-Arc Driven Shock Tube", AIAA Journal, Vol. 9, 1971, pp. 2096–2098, employs a conical configuration for the interior of the driver and a disintegratable lightweight diaphragm. The diaphragm is made of mylar in order to reduce the diaphragm opening losses and to insure a fast opening time. The driver is charged in its conical chamber to just 4 percent less than the static rupture pressure of the diaphragm. When the arc is struck, the diaphragm disintegrates. Disintegration immediately provides a large opening to reduce loss of energy to the conical wall as well as dissociation and ionization of the gas, although there is loss in energy required to break and open the diaphragm. This reduction in the loss of energy permitted an increase in obtainable shock speed with 1.0 torr initial pressure from 15 to 26 km/sec, and allowed simulation of some variables of Jupiter entry, such as temperature, but a shock speed of 40 km/sec from an electric-arc driven shock tube in 1.0 torr of inert gas continued to be unattainable until the present invention.

In a further development described by the present invention in "Development of An Annular Arc Accelerator Shock Tube Driver", Proceedings Ninth International Shock Tube Symposium, Stanford University Press, 1973, pp. 678–689, a gas from a high pressure driver flows past an annular space between a centered cathode and a section of the tube wall copper plated to serve as an anode. As the wave front of the flowing gas passes through that annular space, energy stored in a bank of capacitors is discharged through the space. The resulting arc produces a heated plasma which immediately expands and then cools, driving a shock wave down the tube. The anode section is sufficiently downstream from the cathode to permit a thin insulating diaphragm to be placed between the anode and cathode, thus preventing arc discharge until the pressure wave front has ruptured the insulating diaphragm. While such a passive discharge switch proved to be effective, the slow breaking of the insulating diaphragm disrupted the gas flow and prevented achievement of full shock velocity potential.

SUMMARY OF THE INVENTION

In accordance with the present invention, full shock velocity potential is achieved in an annular arc accelerator shock tube by providing means for detecting a shock wave of a gas initiated by suitable means to coordinate with the flow of gas produced by the initial shock wave the discharge of a capacitor bank across the annular space between a centered cathode and an annular anode in tandem but electrically isolated anode and cathode sections.

All of the structure, from and including the means for initiating a shock wave to the cathode section, is electrically insulated from ground and at the same high potential with respect to ground. The detecting means actuates a delayed trigger generating means and the latter actuates a high current switching means that connects the capacitor bank across the cathode and anode as the initial shock wave passes through the discharge region between the cathode and anode, thus discharging the energy stored in the bank of capacitors into the test gas. In that manner, the test gas is caused to expand and then cool without any delay for the opening of a diaphragm to accelerate a shock wave to velocities significantly greater than could be achieved by the prior art. The cathode tip is conically shaped and countersunk with a conical cavity to form an annular sharp edge for uniform discharge of the capacitor on all sides and minimum erosion of the tip.

BRIEF DESCRIPTION OF THE DRAWINGS

FIG. 3 is a schematic diagram of a trigger spark generator used in the system of FIG. 1.

FIG. 4 is a schematic diagram of a spark gap switch used in the system of FIG. 1.

DESCRIPTION OF THE PREFERRED EMBODIMENTS

Figure 1:
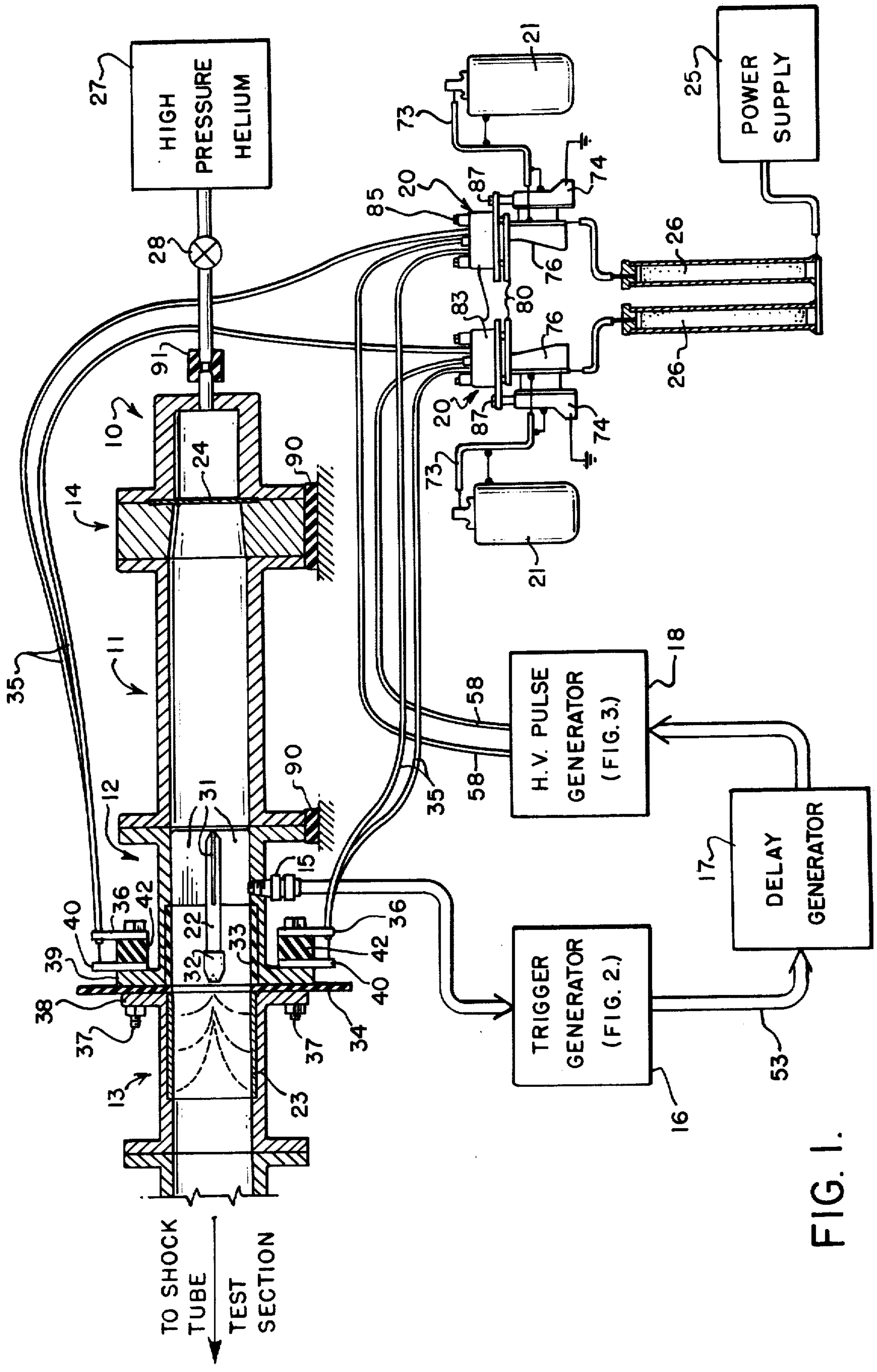
FIG. 1 is a schematic illustration of an annular arc accelerator shock tube of the present invention.

Referring to FIG. 1, the flow system of an annular arc accelerator improved in accordance with the present invention is comprised of a high pressure cold gas driver 10, an expansion section 11, a cathode section 12, and an anode section 13 which connects to a shock tube test section that contains instrument ports mounted flush with the interior surface. A transition section 14 is included between the driver 10 and the expansion section 11.

Figure 2:
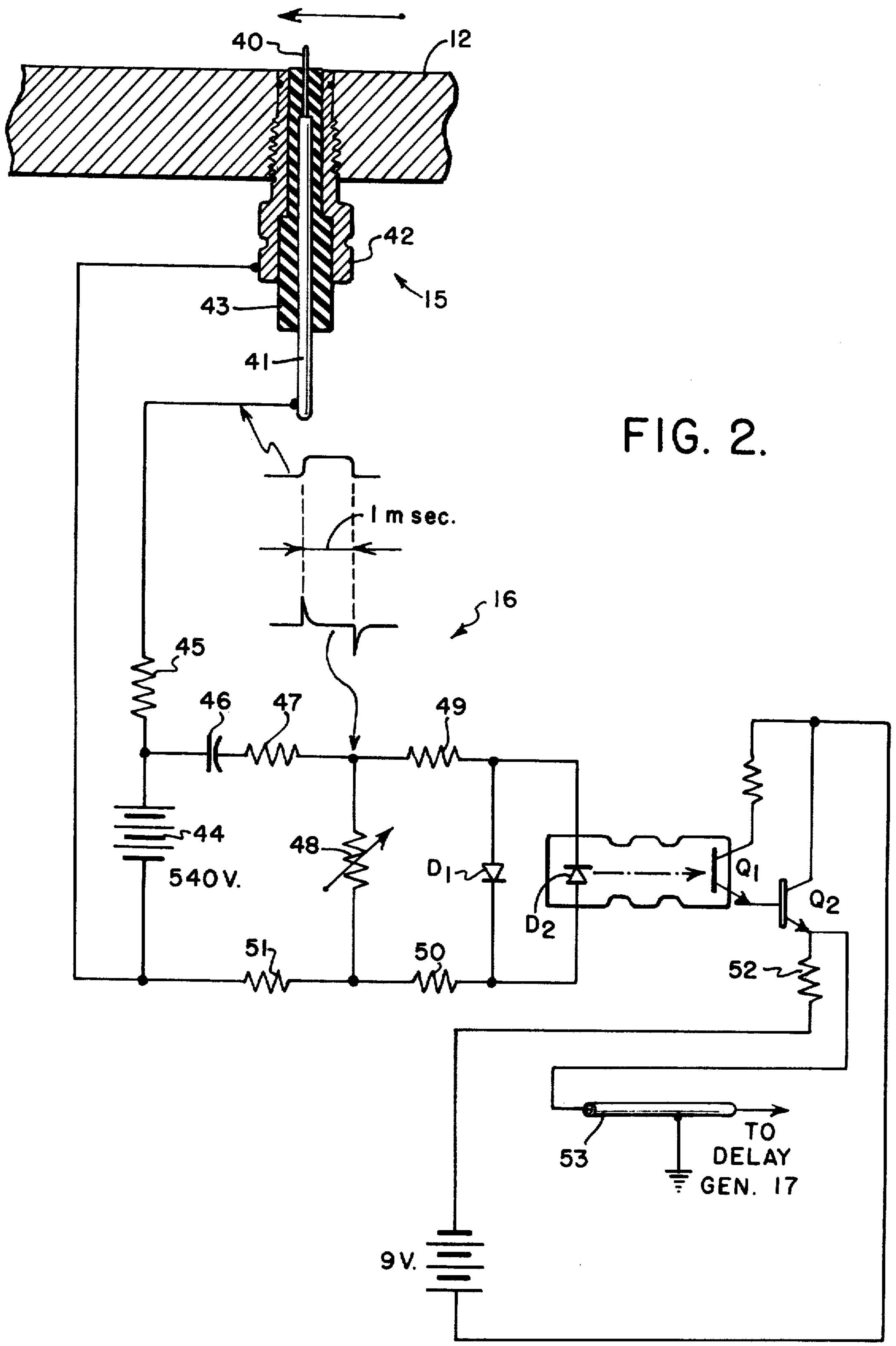
FIG. 2 is a schematic diagram of a flow gauge and trigger generator used in the system of FIG. 1.

The high pressure cold gas driver is used to force a flow of test gas past the high voltage electrode sections 12 and 13. The driver gas accelerates into the expansion section 11 driving a shock wave in front of it. As the flowing gas passes through the electrode sections, an electronically isolated flow transducer 15 senses the arrival of the shock wave produced by the driver section and causes a circuit 16 to generate a trigger pulse that is transmitted through a delay generator 17 to a high voltage pulse generator 18. As will be described more fully with reference to FIG. 2, the trigger generator is electrically isolated from the delay generator and high voltage pulse generator.

The delay generator 17 delays the trigger pulse while the shock wave travels from the position of the transducer 15 to the discharge region which is generally from the end of the cathode section 12 to about two-thirds the distance into the anode section 13. The delayed pulse then causes the high voltage pulse generator to produce a 30kV initiating pulse that fires four spark-gap switches 20, only two of which are shown, to discharge energy stored in capacitors 21 into the test gas between a cathode 22 in the cathode section 12 and an annular copper sleeve 23 in the anode section 13.

The arc heated test gas (plasma) immediately expands and cools without any delay for the opening of a diaphragm, thus accelerating the shock wave down the test section. Shock velocities up to 47 km/sec have been achieved in 1.0 torr of hydrogen using a 300k joule capacitor bank comprised of one-hundred 20kV capacitors divided into groups of 25, each group represented by a symbol indicated by the reference numeral 21.

The initial steps of the shock tube operation are to fill all sections of the shock tube up to a scribed brass diaphragm 24 with the desired initial pressure of test gas. While the capacitor bank is being charged to the desired voltage from a power supply 25 through water-$CuSO_4$ resistors 26, the filling of the driver section 10 is initiated. The driver gas is supplied from a source 27 of high pressure helium gas (such as bank of compressed gas cylinders) through a valve 28. When the capacitor bank has reached the desired voltage, the valve 28 is fully opened to provide the full flow of driver gas from the source 27 until the diaphragm 24 disintegrates at typically 1500 psi. Rapid expansion of the driver gas into the expansion chamber 11 drives a shock wave in the test gas through the electrode sections. When the shock wave reaches the transducer 15, a pulse is generated and sent to the high voltage pulse generator 18 through the delay generator 17. The capacitor bank energy is discharged into the flowing gas behind the shock wave. The arc heated plasma rapidly expands to drive the shock wave ahead of it at velocities significantly higher than 40 km/sec. In that manner the energy of an arc discharge is deposited into the flowing test gas once a shock wave is detected without any delay for the opening of a diaphragm in the electrode section.

The diaphragm 24 in the driver section serves only to suddenly release the driver gas and thus produce the initial shock wave which travels down the expansion section 11 to the electrode sections. Other means for driving the test gas to produce a reasonably definable shock wave may be utilized. The shock wave produces a pulse in the transducer 15 of very short duration, typically 1 msèc.

The cathode 22 is comprised of an aluminum rod mounted in the center of the cathode section of the shock tube by four orthogonal fins 31 extending from the rod to the walls of section 12. The shock tube is cylindrical with a typical inside diameter of 15.2 cm. The cathode and anode sections are typically 30.5 cm long and made of aluminum. The expansion section 11 is approximately 90 cm in length and is made of stainless steel as is the test section of the shock tube. The anode and cathode sections are made of the more conductive metal because the bank of capacitors must be quickly discharged through the walls of the cathode and anode sections. The tip of the cathode 22 is covered with a cap 32 having a pointed (60°) nose countersunk or dimpled (45°) at the tip to effectively provide an annular tip for the arc to be struck across the test gas to the annular copper anode 23. To assure that the arc is between the cathode cap 32 and the sleeve 23, an insulating nylon sleeve 33 is placed in the cathode section around the cap 32. The wall of the cathode section is isolated from the wall of the anode section by an annular spacer 34 of suitable insulating material, such as Lexan.

In the exemplary implementation of the invention illustrated in the drawings, the spark gap switches 20 are connected to the anode and cathode sections through coaxial cables 35. The outer conductor of each cable is connected to the anode section for return current through a tab 36 and an insulated bolt 37 in electrical contact with a flange 38 of the anode section. The bolt is insulated from a flange 39 of the cathode section by a sleeve of suitable insulating material. A tab 40 in direct contact with the flange 39, but spaced from the tab 36 by a spacer 42 of insulating mateial, is connected to the center conductor of the cables. In that manner, a group of capacitors 21 connected to a spark gap switch 20 is discharged through a center conductor of a coaxial cable, the tab 40, the wall of the cathode section 12, the fins 31 of the cathode 22 to the tip 32 thereof. The return for the discharge current is through the copper sleeve 23 in the wall of the anode section 13. From the wall of the anode section, the return current flows through the bolt 37, the tab 36, and the outer conductor of the cable 35.

While only two cables are shown from each spark-gap switch 20 to a flange bolt assembly, it is to be understood that in practice as many as eight cables may be connected from each spark-gap switch to flange bolt assemblies. In that manner, for a bank of 100 capacitors, four spark-gap switches may be used to discharge the separate groups of 25 capacitors in parallel through as many as eight cables per group distributed evenly over eight spaced bolt assemblies.

As noted hereinbefore, the capacitor discharge is coordinated with the shock wave passing through the expansion section 11. That is effected by the electronic trigger system just described which includes the transducer 15 to sense the arrival of the shock wave produced by the driver section. Consequently, the transducer must be sensitive to any small density change across the shock wave that is driven ahead of the helium gas from the driver section.

Because the transducer is mounted directly on the cathode section, it must withstand high voltages, obtain energizing power and transmit electrical signals without creating a discharge path for the capacitors from the cathode 22 to ground. An exemplary flow discharge gauge shown in FIG. 2 will satisfy those requirements. The gauge has good sensitivity and is of rugged construction. It is comprised of a center pin 40 passing through the wall of the cathode section 12 at a distance approximately 17 cm from the anode section. The center pin 40 is made of tungsten and is connected to a brass rod 41 which is connected directly to the trigger generator 16. The brass rod and tungsten pin are insulated from a suitable fitting 42 by material 43, such as nylon. The fitting is threaded into the wall of the cathode section as shown.

Power for the flow discharge gauge is supplied by a source 44 comprised of dry cell batteries connected in series to provide a combined voltage of 540 volts. The negative terminal of that power supply is connected indirectly to the cathode section. Leakage current between the wall of the cathode section and the insulated tungsten tip 40 decreases momentarily as the shock wave passes over the tip, thus producing a positive pulse across a resistor 45. That pulse is differentiated by a capacitor 46 and voltage dividing circuit comprised of a resistor 47 and a potentiometer 48 to produce sharp positive and negative pulses from the positive-going and negative-going edges of the pulse produced across the resistor 45.

The sharp positive pulse produced by the differentiating network is shunted by a diode $D_1$ through balanced load resistors 49 and 50. Another load resistor 51 is included to balance the resistor 47 of the voltage dividing network. The sharp negative pulse is applied to an infrared emitting gallium arsenide diode $D_2$ to produce a pulse of light optically coupled to a silicon phototransistor $Q_1$. Such an arrangement of a light emitting diode and phototransistor in a suitable package is commercially available as a photocoupled isolator.

The collector of the transistor $Q_1$ is connected to a 9V battery while the emitter of the transistor is connected to the base of a transistor $Q_2$. Infrared light impinging on the phototransistor $Q_1$ will cause its emitter current to flow through the base-emitter junction of the transistor $Q_2$ which amplifies the current. A pulse is thus generated across an emitter resistor 52. That pulse is transmitted to the delay generator 17 (FIG. 1) via a coaxial cable 53. The potentiometer 48 is adjusted for the sharp negative pulses to be of sufficient amplitude to cause the output pulse produced across the emitter resistor 52 to be equal to 4 volts.

The entire discharge flow gauge and trigger generator assembly is mounted on the wall of the cathode section in an insulating package which can hold off voltages greater than 20kV.

As noted hereinbefore, the delay generator 17 and high voltage pulse generator 18 delay the initial pulse thus produced while shock waves travel from the flow gauge 15 to the discharge region between the end of the tungsten cap 32 and the downstream end of the copper sleeve 23. In practice, the delay generator is adjustable for delays up to 500 microseconds. A 30kV pulse is then initiated by the high voltage pulse generator.

An exemplary implementation of the high voltage pulse generator is shown in FIG. 3. it is comprised of a silicon controlled rectifier SCR which receives the delayed pulse across a resistor 54 to trigger the SCR and thus discharge a 1 $\mu f$, 600 V capacitor 55. As the capacitor discharges, current flows through the primary winding of a pulse transformer 56. A diode $D_3$ is connected in parallel across the SCR to protect the SCR against reverse bias potentials while a diode $D_4$ connected in series with a resistor 57 is connected across the primary winding 56 to shunt reverse current as the primary winding voltage swings in the opposite direction at the end of the initiating pulse.

The secondary winding of the transformer 56 is connected across a small triggered spark-gap switch 60 which then ionizes a gas in the gap to cause two parallel 0.05 $\mu f$ capacitors 61 to discharge through the ionized gas. The capacitors are initially charged to 15kV. The discharge of the capacitors 61 is through a three-turn coil 62 of coaxial cable. The inner conductor of the coaxial cable is connected as the primary winding for current from the capacitors 61 through the small spark-gap switch 60. As the current flows through the inner conductor and back to the case 63, which provides a return current path for the capacitors, current is induced in the outer conductor which thus functions as a secondary winding of a three-turn pulse transformer. This secondary winding is connected to the inner conductors of coaxial cables 58, the outer conductors of which are grounded and the inner conductors of which are connected to spark-gap switches 20, as shown in FIG. 1. Only two spark-gap switches are shown, but as noted hereinbefore, it is to be understood that four spark-gap switches are driven in parallel in this exemplary embodiment by the high voltage pulse generator shown in FIG. 3.

The small spark-gap switch 60 of the high voltage pulse generator is comprised of an insulated center pin 64 surrounded by an anode 65. When the pulse induced across the secondary winding of the transformer 56 is impressed across the pin 64 and the anode 65, the gas in the spark-gap ionizes to permit high current conduction between the anode 65 and a cathode 66. Operation of the small spark-gap switch is thus very much like that of a thyratron, but the construction is as shown schematically to provide high current flow for the three-turn pulse transformer in order to produce a pulse of sufficient power to trigger the main spark-gap switches 20.

The exemplary implementation of the main spark-gap switches 20 shown in FIG. 4 is very much like that of the small spark-gap switch 60, but designed for much greater current capacity (300 k amps). A trigger pin 70 is insulated from an anode 71 and connected to the inner conductor of the input cable 58 from the high voltage pulse generator. A cathode 72 is connected to the center conductors of cables 73 from a group of capacitors. The outer conductors of the cables 73 are connected to a ground bracket 74 which supports the spark-gap switch. The connection between the inner conductors of the cables 73 and the cathode is through insulated bolts 75 and a collector bracket 76 separated from the ground bracket 74 by a block 77 of insulating material. A cylindrical mylar sleeve 78 isolates the outer conductor of the cable 58 and structure 79 which connects that outer conductor to an anode plate 80.

A base 81 for the spark-gap switch is made of aluminum, as is the anode plate 80. The base plate is separated from the anode plate by a polycarbonate body 82 which has a 15 cm outside diameter, a nominal 11.5 cm inside diameter, and a height of 5 cm. Grooves 0.7 cm deep are provided on the inside surface of the switch body to considerably increase the creepage path for flashover along the inside surface of the switch body. The cathode 72 and anode 71, both of which are 5 cm in diameter, are made of sintered tungsten press fitted into aluminum holders. The anode trigger pin 70 is a 0.25 cm diameter tungsten rod that is insulated from the anode 71 by a 0.9 cm diameter mullite sleeve.

Current from the spark-gap switch is carried to the cathode of the shock tube by coaxial cables 35 arranged radially around the anode 71. Only two output cables are shown but in practice eight such cables are used for greater current capacity. The outer conductors of the output cables 35 carry the return current from the shock tube to a grounded cover 83 made of 0.4 cm aluminum. The inner conductors which carry current to the cahtode of the shock tube are connected to the anode plate 80 which is spaced from the grounded cover 83 by insulating material 84. Bolts 85 insulated by mylar sleeves 86 hold the anode plate 81 clamped between the insulating material 84 and the switch body 82. The ground cover 83 is connected to the ground bracket 74 by a bolt 87. A mylar insulator 88 prevents arcing between the base 80 and ground cover 83.

While the spark-gap switches are being fired, the inside of each spark-gap is continuously flushed with dry air through a manifold of tygon tubing 89 connected to the cathode plates. A port (not shown) in the plate 80 permits the flushing dry air to be exhausted to the atmosphere. The flushing dry air helps prevent carbon deposits and nitric acid from building up inside spark-gaps by sweeping the arc heated gases and burned material out of the exhaust port immediately after the gap has fired.

Charging resistors 26 (FIG. 1) are required for charging the bank of capacitors from the power supply 25, one resistor 26 for each main spark gap switch, to prevent the energy of the full capacitor bank from being absorbed in a single spark-gap switch if one of the switches prefires. Each resistor is capable of dissipating the full 300K joule energy of the capacitor bank. Electrolytic resistors are used to dissipate that much energy. Each resistor is comprised of a 7.5 cm diameter, 100 cm long, acrylic tube filled with approximately 4 liters of a copper sulfate solution (water-$CuSo_4$). Brass sheet metal electrodes are mounted at each end of the tube. The nominal resistance of each tube is 2000 ohms.

The capacitor bank consisting of one-hundred 14.7 μf capacitors having a maximum available energy of 300 joules is charged with a 20kV power supply having a 0.4 peak current. The capacitor bank is divided into four parts, as noted hereinbefore, each with its own spark gap switch. By employing four spark-gap switches, the system is able to discharge 1.5 million amp peak currents into the shock tube with discharge times less then 50 micro-seconds. Four spark-gap switches were considered the most convenient in this exemplary embodiment due to the need for compatibility with an existing annular arc accelerator shock tube. The banke of 100 capacitors is thus divided into four groups of 25, one group for each main spark-gap switch that discharges the group through eight cables 35 to eight flange bolt assemblies on the shock tube.

The pressure in the cathode and anode sections is very high at the time the capacitors are discharged through the spark-gap switches. Since the gas breakdown distance is very large at these pressures, high breakdown voltages are required. Consequently, it is desireable to electrically isolate the expansion section 11 and high pressure driver 10. While that could be accomplished by an annular spacer of suitable insulating material, such as the spacer 34 between the anode and cathode sections, it would be preferrable to provide insulating supports 90 for the expansion section and driver. The high pressure source of helium is then isolated by a coupling section 91 of suitable insulating material, such as nylon, in the high pressure fill line. Since all of the structure from the high pressure driver to the cathode section are now at a high voltage with respect to ground during operation it is necessary to physically exclude operating personnel from the entire structure between at least the spacer 34 and the coupling 91 during operation. The high pressure source 27 of helium, and the on-off control for the power supply 25 are placed in a room adjoining the area from which personnel are excluded.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. In an annular arc accelerator shock tube having a section for initiating a shock wave in a test gas, said shock wave traveling into a test section through electrode sections where energy stored in a bank of capacitors is discharged into the test gas to accelerate the shock wave, the improvement comprising means not interfering with gas flow for detecting said shock wave passing into said electrode sections before discharging said capacitors into said test gas and means responsive to said detecting means for triggering discharge of said energy stored in said bank of capacitors into said test gas immediately behind said shock wave, whereby said test gas is arc heated to accelerate said shock wave into said test section.

2. In an annular arc tubular accelerator shock tube having means for initiating a shock wave through a tubular test section, the combination comprising a tubular section having a cathode centered therein and a tubular anode section connected in tandem with said cathode section with an annular insulating spacer between said cathode section and said anode section, said tandem sections constituting electric arc discharge electrodes between said test section and said means for initiating a shock wave, means for detecting said shock wave before it reaches said insulating spacer, means responsive to said detecting means for generating a delayed trigger pulse, a bank of capacitors, and high-current switching means connecting said bank of capacitors to said cathode and said tubular anode section for arc discharge of said capacitors between said cathode and annular anode section, said switching means being responsive to said delayed trigger pulse generating means to switch high current flow through said cathode and tubular anode section as said initial shock wave travels through the arc discharge region between said cathode and tubular anode section.

3. The combination of claim 2 wherein said shock-wave detecting means is mounted in the wall of said cathode section behind the tip of said cathode.

4. The combination of claim 3 including a sleeve of insulating material inside of said cathode section at its forward part from the end thereof to a position forward of said detecting means to assure arc discharge between said cathode at its forward tip and said tubular anode section.

5. The combination of claim 4 wherein said cathode electrode is pointed, and the point is countersunk to provide an annular tip for annular arc discharge between the tip and said tubular anode section.

6. The combination of claim 2 wherein all of the structure, from and including the means for initiating a shock wave to the insulating spacer between said cathode section and said anode section, is electrically insulated from ground.

7. The combination of claim 6 wherein said shock wave detecting means is comprised of a flow gauge mounted in the wall of said cathode section behind the tip of said cathode, said flow gauge comprising a conductive pin passing through the wall of said cathode section, and electrically isolated from said wall, said pin being connected to said trigger pulse generating means by a first conductor electrically isolated from a second conductor connecting said cathode section wall to said trigger pulse generating means, and means for applying sufficient voltage between said first and second electrical conductors to cause leakage current between said pin and said cathode section wall, whereby said trigger pulse generating means responds to any change in current flow between said pin and said cathode section wall due to the passing of a shock wave over said pin.

8. The combination of claim 7 including a sleeve of insulating material inside of said cathode section at its forward part from the end thereof to a position forward of said pin of said flow gauge to assure arc discharge between said cathode at its forward tip and said tubular anode section.

9. The combination of claim 8 wherein said cathode electrode is pointed, and the point is countersunk to provide an annular tip for annular arc discharge between the tip and said tubular anode section.

* * * * *